P. K. STERN, DEC'D.
E. L. STERN, EXECUTRIX.
UNIVERSAL JOINT.
APPLICATION FILED JUNE 20, 1913.
1,143,660.
Patented June 22, 1915.
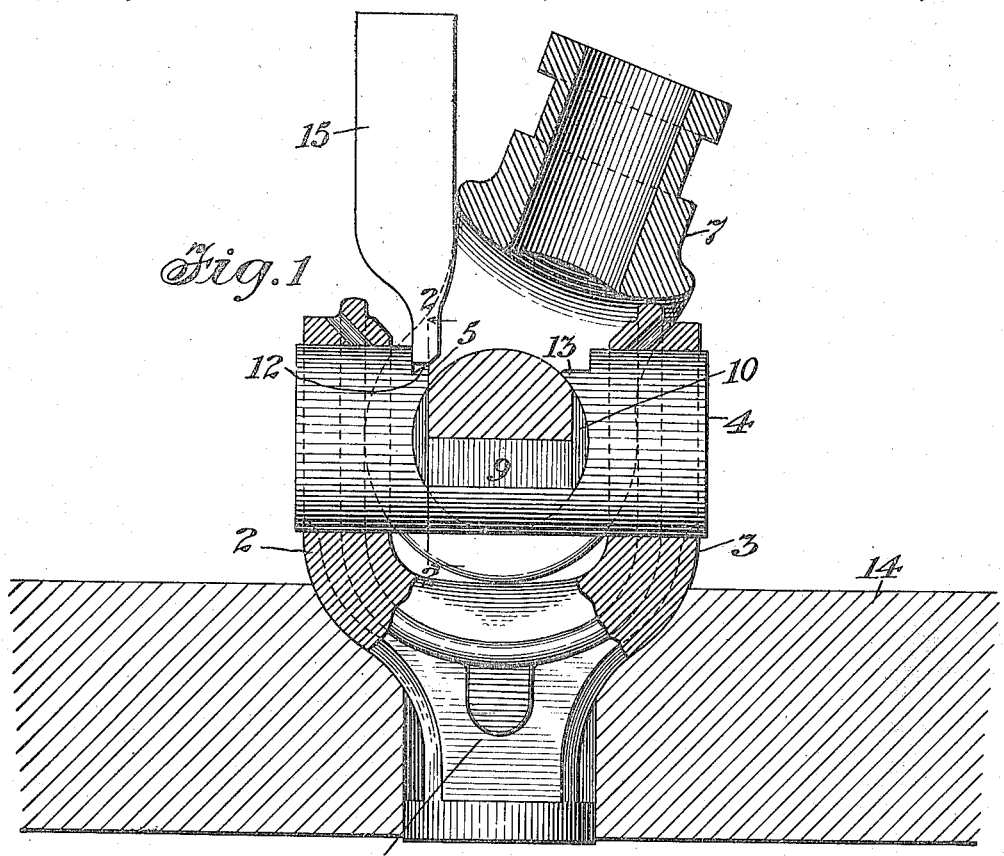
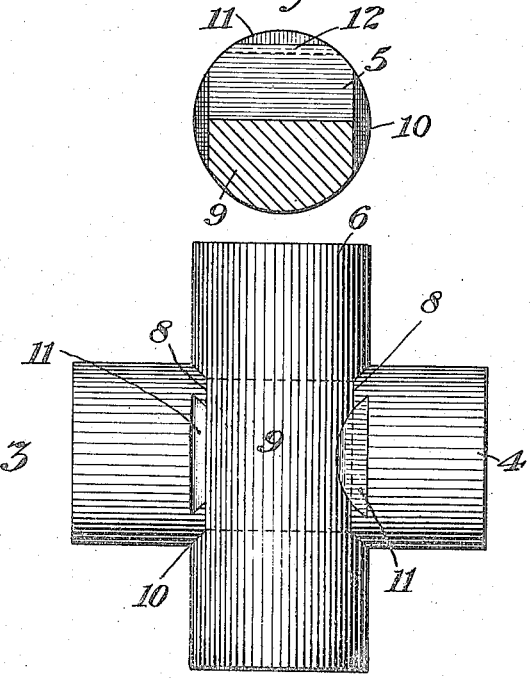
WITNESSES
Chas. F. Clagett
E. L. Stern.
INVENTOR
Philip K. Stern

UNITED STATES PATENT OFFICE.

PHILIP K. STERN, OF NEW YORK, N. Y.; ELIZABETH L. STERN, EXECUTRIX OF SAID PHILIP K. STERN, DECEASED, ASSIGNOR TO FRANK M. RANDALL MANUFACTURING CORPORATION, OF NEW YORK, N. Y.

UNIVERSAL JOINT.

1,143,660.   Specification of Letters Patent.   Patented June 22, 1915.

Application filed June 20, 1913. Serial No. 774,896.

*To all whom it may concern:*

Be it known that I, PHILIP K. STERN, a citizen of the United States, residing in the city, county, and State of New York, have invented certain new and useful Improvements in Universal Joints, of which the following is a specification.

This invention in universal joints relates to that type adapted to pivotally connect a pair of shaft terminal members, permitting the rotation of the sections of a power shaft during irregularities in the axial alinement thereof. The invention has more particular reference to a dual axis coupling member, comprising a pair of crossed and interlocked coupling pins, having their axes disposed at right angles to each other, and lying in a common plane, whereby an axial member common to the two terminal members of the joint is provided. In this connection, my invention is directed to a novel manner of construction, whereby the coupling pins are engaged, interlocked, and made secure after each of the coupling pins have been assembled and positioned in the terminal members, and after the said pins have been hardened.

The object of my invention is to provide a simple and inexpensive construction for universal joints of the character referred to, comprising a minimum number of parts conducive to simplicity in construction and economy in maintenance.

The objective feature of the invention is embraced in the construction, as illustrated in the drawing and appended descriptive matter, forming part of this specification, and the distinct features of novelty are pointed out in the claims.

With reference to the drawings, Figure 1 is a side elevation of a universal joint, constructed in accordance with my invention, with a portion of the terminal members removed, in order to disclose the constructive features of the dual axial coupling member. In this figure, I have illustrated the joint terminal members, together with the common coupling member as being subjected to an operation for the interlocking and securing together, of a pair of crossed coupling pins, which constitute the axial member. Fig. 2 is a sectional elevation of the coupling pin taken on the line 2—2 of Fig. 1. Fig. 3 is a top plan view of the pair of crossed and interlocked coupling pins, illustrating the manner in which I secure them together and the result of the operation as indicated in Fig. 1.

In the several figures, similar characters of reference designate like parts.

1 designates a universal joint terminal member, comprising a fork, having two prongs 2 and 3, carrying a horizontal axial coupling member 4. This latter is of cylindrical formation, and is notched out intermediately and transversely, to provide a cross slot 5, equal in depth to one half of the diameter of the coupling member 4. This latter carries a similar coupling member 6 at right angles, together with a second terminal member 7. The coupling members 4 and 6 are identical in construction, and comprise substantially, a pair of metallic cylindrical bearing pins, upon which the terminal members 7 and 1 swing. These pins are slabbed laterally along lines 8, to form necks 9, and are provided with mitered shoulders 10, whereby, when the pins 4 and 6 are interfitted with each other by engaging the necks 9 in the notches or cross slots 5 of each of the said pins respectively and by forcing them together laterally, their axes lie in a common plane and at right angles to each other, and their mitered shoulders are brought into immediate contact with each other. In addition, to the cross slots 5 in each of the pins 4 and 6, marginal, transverse and parallel V notches 11 are cut or otherwise formed, to provide projecting tongues 12. These latter are adapted to be thrown over or upset after the pins 4 and 6 are coupled, whereby a bur, extending over onto the cylindrical surface of the neck 9 of each of the pins, will result. These burs are designated 13, and the manner in which they are formed is indicated in Fig. 1, to wit: In each of the terminal members, a coupling pin 4 and 6 respectively, is introduced to their respective forks 2 and 3, with the cross slots of each of the said pins presented outwardly with respect to the terminal members 1 and 7, after which one of the terminal members, as for example, that designated 1, is thrust into a die, jig, or other fixture, designated 14, which is shown in sectional elevation in Fig. 1 and adapted to carry the terminal member 1 by resting the same on the base portion of the forks 2 and 3 within said fixture 14. Next, the other terminal member, as for example that designated 7, together with its coupling pin 6, is assembled with the terminal member 1 by interlocking the necks 9 of the pins 4 and 6 respectively, by pressing the free end of the terminal member 7 downwardly, in the direction of the die or anvil 14; after which, the terminal member 7 is swung into an inclined position, and an upsetting punch or other tool 15, is brought down upon a projecting tongue 12 with sufficient force, as afforded by a riveting, or other machine or press, to cause the upsetting of the tongue 12, and to throw the metal over upon the cylindrical surface of a corresponding neck 9 of coupling pin 6, whereby, an overhanging bur or lip results, which effects the locking of the coupling pins 4 and 6 together.

Upon the withdrawal of the punch 15, beyond the free end of the terminal member 7, and swinging the latter to an opposite inclined position, with respect to the terminal member 1, and upon transferring the tool 15 to the opposite projecting tongue 12, and similarly positioning it with respect to the fork 3, and upon repeating the riveting operation thereat, a second lip or bur 13 is formed whereby, the pin 6 is become locked to the pin 4 by two oppositely situated burs, formed from the projecting tongues 12 by the upsetting or riveting operation of the tool 15.

To engage the neck 9 of the pin 4 in a similar manner to that of the pin 6, the joint, comprising the terminal members 1 and 7 and pins 4 and 6, is removed from the die 14 and reversed, and again returned to the die 14 in this reversed position, whereby, the terminal member 7 is brought into that position which the terminal member 1 had previously assumed. After thus positioning the terminal member 7 in the die 14, the operation of upsetting over the remaining two projecting tongues 12 of the pin 6 may be proceeded with, as in the previous instance, when the interlocking and final securing of the pins 6 and 4 to comprise an integral coupling member will have been completed.

In practice, I have found in types of universal joints, as employed in connection with the transmission systems of automobiles, the coupling pins 4 and 6 render satisfactory service when constructed of mild steel, which may be either rolled or drawn cold advantageously, and sufficient hardness for a wearing surface is attained by case hardening. When it is desired to case harden these coupling pins, and after machine operations on them have been completed, they may be assembled in their respective forks 2 and 3 of the terminal members 1 and 7 respectively, and the projecting tongues 12 forced over satisfactorily to form the burs, or lips 13, providing, however, the case hardening does not reach any considerable depth. I have found that when these coupling members are hardened in cyanid of potassium by the immersion process, the hardened scale does not enter too deeply below the surface to interfere with the successful upsetting of the projecting tongues 12.

It will be understood by the foregoing description of my invention, that a simple, durable, and inexpensive construction for universal joints is presented, whereby the joint may be constructed of but four pieces in all, thus conducive to its simplicity, as well as economy in renewal of the parts of which it is composed, and moreover, it is obvious that the construction is simple and inexpensive.

I claim:—

1. A universal joint comprising a pair of terminal members, and a pair of interlocked coupling members having their axes at right angles to each other in a common plane, each coupling member being provided at each end with a cylindrical formation, and an intermediate recessed neck portion, each end of the neck portion having mitered shoulders, said cylindrical formation having a transverse notch and projecting tongue formed at each end of the recessed portion, and said projecting tongue of each coupling member being upset and overlapping a portion of the upper surface of the other coupling member to lock the said coupling members together.

2. A universal joint comprising a pair of terminal members each having a pair of forks provided with bearing surfaces, a coupling pin in each of said forks, said coupling pins being slabbed on opposite sides intermediately, to provide necks, and notched at right angles thereto into the necks, said necks having a transverse notch and projecting tongue formed on the opposite sides of each of the pins, each of said tongues being upset and engaging the neck of the other of the pins to secure the said pins firmly together.

3. A universal joint comprising a pair of cylindrical members each intermediately recessed to form a lateral neck, the opposed walls of the recess in each member being at right angles to its base, to receive the neck portion of the other member in crossed relation, with the neck surfaces of said members juxtaposed, thereby forming a snugly interfitting bi-axial joint, each member having a transverse notch near each wall perimeter, forming tongues, the tongues of one member being upset and overlapped upon the adjacent surface of the other member to lock said members together.

In testimony whereof, I have signed my name to this specification in the presence of two subscribing witnesses.

PHILIP K. STERN.

Witnesses:
E. L. STERN,
R. H. TUBBS,